Patented Sept. 17, 1929

1,728,382

UNITED STATES PATENT OFFICE

ARTHUR S. WATTS, OF COLUMBUS, OHIO

PORCELAIN PRODUCT AND METHOD OF MANUFACTURING THE SAME

No Drawing. Application filed November 5, 1925, Serial No. 67,114. Renewed December 12, 1928.

This invention relates to the manufacture of porcelain ware, the main object of the invention being to produce a superior vitrified porcelain product.

Another object of the invention is to provide a process of heat treating a molded body or article of porcelain forming material, whereby the porcelain product may be readily, conveniently and economically made.

Still another object is to provide a finished vitrified porcelain product which will consist of a thoroughly matured body having the required amount of translucency, and a smooth, sufficiently glazed surface, presenting superior rigidity and mechanical strength.

My invention is adaptable to the production of many special porcelain articles and especially to porcelain artificial teeth.

In carrying my invention into practice, I first provide a formed body or article having such composition that it can be vitrified by heat at a suitable predetermined temperature without fusion and which composition is capable, upon surface fusion, of producing a glazed surface. The formed bodies or articles, known in the dental porcelain art as biscuits, are then subjected to heat treatment in a suitable kiln having preheating, vitrifying, glazing, temperature drop and annealing zones, through which the ware is conducted for the progressive carrying on of these operations.

The ware being at room temperature enters the kiln, passing gradually into and through the preheating zone. The latter heat zone slowly drives off all moisture from the biscuit articles. The slow elimination of moisture protects the green ware from cracking. From the preheating zone the ware travels into the vitrifying zone, where it receives sufficient gradual rise and intensity of temperature to mature the porcelain throughout all sections of the ware. This heat zone may be said to exert a soaking action on the ware, thus bringing all parts of the ware to the same temperature. The ware then travels into the firing zone where there is an abrupt rise of temperature, sufficient in intensity and of long enough duration to surface glaze or fuse the ware. It is important that the small pores on the surface be healed by fusion to produce a dense, smooth, sufficiently glazed texture, and still as important that the heat reaction does not distort or cause the ware to collapse. Properly timed, the ware is then passed into a temperature drop zone. This zone provides an abrupt drop in temperature of sufficient salience to suddenly arrest all flow and fusion of the ware. The latter then travels into and through an annealing zone, where the ware is exposed to a gradual decrease in temperature, followed by a prolonged gradual cooling action until room or relatively near room temperature is reached. The cooling action preferably follows the annealing action as a distinct step in the same kiln, but these actions may be combined by suitable temperature adjustments, or they may be conducted in separate kilns, if desired.

There are possibly many porcelain forming compositions which can be used and treated according to my process for the production of a porcelain article having the salient features of my invention. The temperatures at which these compositions are treated in the successive steps of operation obviously may vary within certain ranges, according to their character. I do not, therefore, desire to be restricted to any particular porcelain forming composition or any particular temperatures employed, so long as the essential features of my method and the improved article resulting therefrom are preserved and produced. In its basic form my invention contemplates the heat treatment of a porcelain forming composition of suitable character so as to gradually raise it to a suitable vitrifying temperature and vitrify it, then raise it abruptly to a suitably higher fusing temperature at which it is held until surface fusion takes place, then abruptly reducing the temperature to a suitable temperature below its surface fusing temperature to arrest the surface fusion when a glazed coating of a desired depth is formed, and finally annealing and cooling at suitable temperatures. The time periods of these heat treatments may also vary as may be required due to the character of the composition used and other factors, and accordingly my invention in its broad aspect is not restricted in this connection. For purpose of exemplification, however, it may be stated that I may use a composition having the qualities defined and consisting of feldspar, clay and quartz. This composition may have the property of maturing and becoming vitrified within a given time period at a temperature of about 2320° F. and of fusing at a temperature of about 2460° F. When made of such a composition the molded articles may be subjected to a preheating treatment at the first-named temperature of 2320° F. for a period of about thirty minutes and the maturing and vitrification effected by continuing the heating action at the same temperature for an additional period of from ten to fifteen minutes according to conditions and the degree of rigidity desired. The glazing action is then carried out by raising the temperature abruptly from the vitrifying temperature of 2320° F. to the fusing temperature of 2460° F., which may be held for a short time, e. g., for a period of about one minute. The temperature is then dropped abruptly to a sufficient temperature below fusing temperature, for example, to a lower temperature of 2250° F., in order to check and arrest the glazing action, whereupon the annealing treatment may begin, which may be conducted at such temperature of 2250° F. for about thirty minutes. The annealing process may, however, employ a range of decreasing temperatures below that indicated and above the temperature at which annealing or toughening of the body is no longer increased. The articles may then be cooled down for a suitable period and to a suitable temperature at which they may be safely removed from the furnace.

Porcelain ware baked by this process yields a thoroughly matured body or interior mass, develops a maximum of translucency for a given body, has fine color, produces a smooth sufficiently glazed surface, and imparts great mechanical strength and rigidity.

As a result of the glazing process, the surface material of the vitrified body is raised to a temperature at which it fuses into a dense glazed skin or covering, which is not only fused to but with and as an integral part of the body or internal material itself.

All of the advantages I have enumerated are much desired in porcelain artificial teeth. The dense surface upon a vitrified tooth body imparts a finished natural appearance, free from blebs and blisters. These blebs are not only unsightly and cause considerable loss to the manufacturer, but often burst, leaving a pit or crater formation in which débris will lodge, causing dark spots, or specks. The latter are often even more conspicuous than the blisters, rendering the teeth unmarketable. Translucency and strength are also much needed, the former adding materially to the natural appearance and imparting depth of tone, the latter not only giving longer service by standing up under heavier stresses, and strains, but due to the superior strength of the vitrified body, needs show less gold as supporting structure where teeth are used in bridgework. However, my invention is not limited to the production of a dental porcelain, although of great value for the purpose, as it may be employed for the production of other porcelains of special kind and quality and having the desirable characteristics mentioned.

What I claim is:—

1. The process of producing a porcelain article, which consists in forming a body of a porcelain mixture, subjecting the same to a gradually increasing temperature until the desired vitrification is effected, abruptly raising the temperature so as to fuse the surface of the body and form a glazed coating on the said surface, abruptly lowering the temperature sufficiently to arrest fusion, and then annealing and cooling the porcelain.

2. The process of producing a porcelain article, which consists in forming a body of a porcelain mixture, gradually heating the same up to a temperature of about 2320° F. or such temperature as will effect the desired vitrification of the body, raising the temperature abruptly to about 2460° F. or such temperature as will cause fusion of the surface of the vitrified body, abruptly reducing the temperature to about 2250° F. or sufficiently to arrest fusion, annealing the vitrified glazed body at a lower temperature, and cooling.

3. The process of producing a porcelain article, which consists in forming a body of a porcelain mixture, heating the same to cause vitrification thereof, raising the temperature above the vitrification temperature to cause fusion of the surface of the vitrified body, suddenly reducing the temperature so as to arrest fusion when a glazed coating is formed, and then annealing and cooling.

4. That step in the art of making a porcelain having a glazed surface integral therewith from a porcelain mixture capable of being vitrified and fused at predetermined temperatures, which consists in raising the temperature of the vitrified material between vitrification and annealing stages to a degree and for a time period to cause surface fusion only of the vitrified material.

5. The process of producing a porcelain article, which consists in forming a body of porcelain mixture, subjecting the same to a gradually increasing temperature until the desired vitrification is effected, abruptly raising the temperature so as to fuse the surface of the body and form a glazed coating on said surface, and abruptly lowering the temperature sufficiently to arrest fusion.

6. A porcelain product comprising a body matured to a desired vitrification and a glazed coating formed by surface fusion of the body to a definitely predetermined depth producing a definitely defined body and a definitely defined glaze.

7. A porcelain product having the same composition throughout, the interior portion being matured by heat to a state of vitrification while the surface portion is matured to a state of fusion which shall be distinct from the vitrification developed within the interior portion of the article.

In testimony whereof I affix my signature.

ARTHUR S. WATTS.